United States Patent
Kim et al.

(10) Patent No.: US 9,300,650 B2
(45) Date of Patent: Mar. 29, 2016

(54) INFORMATION SECURITY SYSTEM IN SMART MOBILE ENVIRONMENT

(71) Applicant: ICTK CO., LTD., Seoul (KR)

(72) Inventors: Dong Kyue Kim, Seoul (KR); Byong Deok Choi, Seoul (KR); Dong Hyun Kim, Gyeonggi-Do (KR); Sang Seon Park, Gyeonggi-do (KR)

(73) Assignee: ICTK CO., LTD., Gyeonggi-do (KR)

( * ) Notice: Subject to any disclaimer, the term of this patent is extended or adjusted under 35 U.S.C. 154(b) by 0 days.

(21) Appl. No.: 14/351,860

(22) PCT Filed: Oct. 4, 2012

(86) PCT No.: PCT/KR2012/008023
§ 371 (c)(1),
(2) Date: Apr. 14, 2014

(87) PCT Pub. No.: WO2013/055059
PCT Pub. Date: Apr. 18, 2013

(65) Prior Publication Data
US 2014/0298431 A1  Oct. 2, 2014

(30) Foreign Application Priority Data

Oct. 13, 2011 (KR) .................. 10-2011-0104426
May 30, 2012 (KR) .................. 10-2012-0057132

(51) Int. Cl.
*H04L 29/06* (2006.01)
*H04W 12/06* (2009.01)

(52) U.S. Cl.
CPC ................ *H04L 63/08* (2013.01); *H04L 63/12* (2013.01)

(58) Field of Classification Search
USPC ............................................... 726/5
See application file for complete search history.

(56) References Cited

U.S. PATENT DOCUMENTS

2009/0270129 A1* 10/2009 Kuo et al. ............. 455/558
2012/0190362 A1*  7/2012 Subbarayudu et al. .... 455/435.1

FOREIGN PATENT DOCUMENTS

| | | |
|---|---|---|
| CN | 101568106 A | 10/2009 |
| KR | 10-2005-0058774 | 6/2005 |
| KR | 10-0872175 B1 | 12/2008 |
| KR | 10-2010-0021446 | 2/2010 |
| KR | 10-20100137145 | 12/2010 |
| WO | WO-2011/106569 A2 | 9/2011 |
| WO | WO-2011/109750 A1 | 9/2011 |

OTHER PUBLICATIONS

International Search Report for PCT/KR2012/008023, dated Feb. 25, 2013.
Chinese Office Action issued in Chinese Application No. 201280050581.9 dated Nov. 23, 2015.

* cited by examiner

*Primary Examiner* — Tu Nguyen
(74) *Attorney, Agent, or Firm* — Marshall, Gerstein & Borun LLP

(57) ABSTRACT

Provided is a security communication method of a terminal device. A first authentication unit of the terminal device identifies a first subscriber to connect a first communication network. A second authentication unit of the terminal device exclusively operates with the first authentication unit, and identifies a second subscriber to connect a second communication network which is different from the first communication network. When the second subscriber is identified, at least one external communication module of the terminal device can be inactive.

16 Claims, 8 Drawing Sheets

INFORMATION SECURITY SYSTEM IN SMART MOBILE ENVIRONMENT

TECHNICAL FIELD

The present invention relates to terminal device security, and more particularly, to information security in a field requiring a high level of security when a smart mobile device connects to a communication network, for example, in military communication.

BACKGROUND ART

In recent years, information terminals capable of communicating, for example, smartphones and tablet personal computers (PCs), have been rapidly propagated and such trend is expected to continue and thus, conventional feature phones and existing smartphones are expected to be replaced.

Based on statistical data, a number of smartphones released in 2011 was expected to increase by 60% compared to the number released in 2010, and the number to be released in 2015 is expected to surpass a majority, for example 54.4%, of mobile phones released.

Hence, the information terminals, for example, smartphones, may not be excluded from an environment, such as, a military communication environment, in which communication security and data leakage prevention are considered critical factors.

In a number of countries, including the United States, measures are being initiated for application to smartphones, for example, an iPhone, interworking with military equipment for military tactics and strategies.

However, such smart mobile devices may be exposed to a universal communication network, for example, wireless fidelity (WiFi) and Bluetooth, and thus, data may be leaked through an external memory device and a malignant code may be installed in a terminal to extract the data. Thus, reinforced information security for the devices is necessary.

DISCLOSURE OF INVENTION

Technical Goals

An aspect of the present invention provides an apparatus and a method with an increased level of security by separating an access of a terminal device to a communication network and an authentication process when operating smart devices in a field requiring a high level of security, for example, communication security and data leakage prevention.

Another aspect of the present invention provides an apparatus and a method for intensifying secure authentication and preventing, in advance, data leakage from a terminal device, while simultaneously minimizing a new design applied to a structure of a conventional smartphone and thus, fully utilizing a conventional platform.

Technical Solutions

According to an aspect of the present invention, there is provided a terminal device including an application processor to perform information processing for a terminal device, a first authentication unit to identify a subscriber when the terminal device connects to a communication network, and a second authentication unit to identify a subscriber to the terminal device by exclusively operating with the first authentication unit. When the second authentication unit identifies the subscriber to the terminal device, the application processor may inactivate remaining modules among modules for communication or data storage which are included in the terminal device, from which a predetermined permanent operation group is excluded.

Here, the permanent operation group may include a baseband module providing a cellular communication connection. The remaining modules, excluding the permanent operation group, may include at least one of a wireless local area network (WLAN) module, a Bluetooth module, a near field communication (NFC) module, and data storage media.

The second authentication unit may include an authentication circuit to perform secure authentication and block an unauthorized external access and an authentication module to identify the subscriber to the terminal device with respect to an access authorized by the authentication circuit.

Here, the authentication module may be configured by a mobile trusted platform module (mTPM).

Also, the authentication module may include a protected storage. Here, the authentication circuit may include a physical unclonable function (PUF) and perform the secure authentication using at least one identification key provided by the PUF.

At least one of the first authentication unit and the second authentication unit may be provided in a form of a subscriber identity module (SIM) card. The second authentication unit may be provided in a form of a secure digital (SD) card.

According to another aspect of the present invention, there is provided a terminal device including a first authentication unit to identify a first subscriber to be connected to a first communication network and a second authentication unit to identify a second subscriber to be connected to a second communication network different from the first communication network. When the second subscriber is identified, the second communication network may be connected and at least one external communication module may be inactivated.

Here, the second communication network may be one of a dedicated military communication network, a dedicated administrative communication network, and a dedicated power management communication network.

Also, the second authentication unit may include an authentication module configured by an mTPM. The authentication module may include a protected storage.

The second authentication unit may include an authentication circuit to perform secure authentication and block an unauthorized external access. The authentication circuit may include a PUF and perform the secure authentication using at least one identification key provided by the PUF.

According to still another aspect of the present invention, there is provided a security management method for a terminal device including terminating communication performed by identifying a subscriber to the terminal device by a first authentication unit when a second authentication unit identifies the subscriber to the terminal device during identification of the subscriber by the first authentication unit, and inactivating at least one communication module of the terminal device.

The security management method may further include blocking an access to the terminal device through an external input and output interface. Here, when the first authentication unit identifies the subscriber to the terminal device, communication may be performed using a cellular network provided by an external communication operator. When the second authentication unit identifies the subscriber to the terminal device, communication may be performed using a dedicated secure communication network different from the cellular network.

Effects of Invention

In a case of operating a smart device in a field requiring a high level of security, for example, communication security or data leakage prevention, unintentional data leakage or illegal poaching of information may be prevented in advance.

Also, an information security system described herein may be compatible with platforms of existing terminal devices, and secure communication authentication may be further intensified.

A smart device may be safely used in communication for defensive and military purposes and thus, both convenience and safety may be simultaneously satisfied. Also, the smart device may be used for defensive and military purposes and thus, competence in conducting a military operation may be improved.

Further, accuracy and effectiveness in weapon systems and manpower management may be increased. Also, an expeditious conduct of the military operation and an effective conduct of a joint operation may be enabled and thus, a military operation paradigm may be completely changed.

Furthermore, a separate military application store may be safely operated and thus, safety of application distribution may be improved.

BEST MODE FOR CARRYING OUT THE INVENTION

Figure 1:
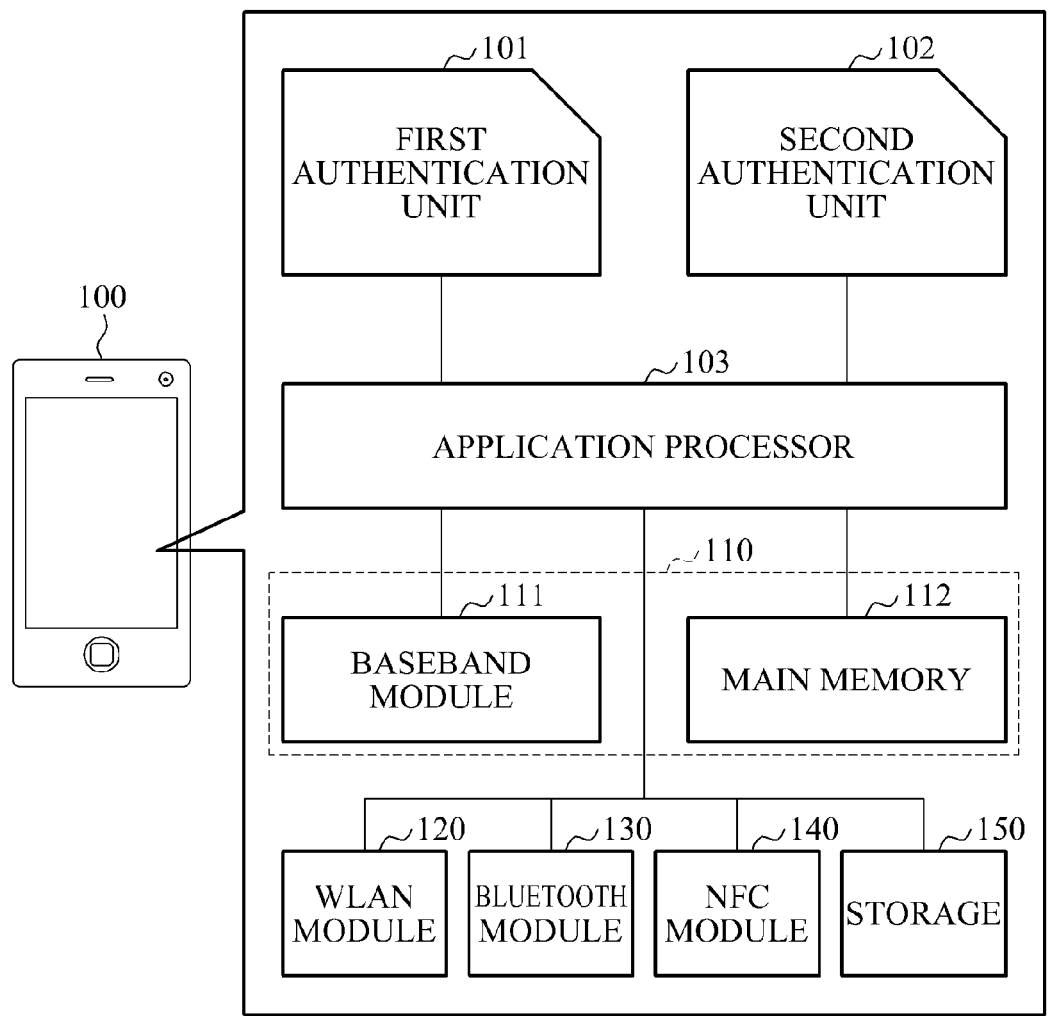
FIG. 1 is a block diagram illustrating a terminal device based on an information security method according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a block diagram illustrating a terminal device 100 based on information security method according to an embodiment of the present invention.

The terminal device 100 may be considered an information terminal, for example, a smartphone, capable of accessing a communication network, but is not limited to such devices.

According to an embodiment, when the terminal device 100 connects to a network provider through the communication network, the terminal device 100 may include a first authentication unit 101 and a second authentication unit 102 to identify a subscriber and perform secure authentication for communication or electronic commerce.

Each of the first authentication unit 101 and the second authentication unit 102 may be provided in a form of a subscriber identity module (SIM) card in which subscriber information is provided or a universal subscriber identity module (USIM) card for which the SIM card is combined with a universal integrated circuit card (UICC), but is not limited the examples provided herein.

For example, at least one of the first authentication unit 101 and the second authentication unit 102 may be configured by a memory card, for example, a secure digital (SD) card.

According to an embodiment, the first authentication unit 101 may identify a subscriber to the terminal device 100 in a communication network, which is performed exclusively with the second authentication unit 102. For example, only one of the first authentication unit 101 and the second authentication unit 102 may identify the subscriber to the terminal device 100 at one point in time. However, both the first authentication unit 101 and the second authentication unit 102 may not simultaneously identify the subscriber to the terminal device 100.

According to an embodiment, the first authentication unit 101 may identify the subscriber to the terminal device 100 in the communication network only in a general communication mode, not in a secure communication mode. Conversely, when the terminal device 100 is in the secure communication mode, for example, when the terminal device 100 connects to a dedicated military communication network, the second authentication unit 102 may identify the subscriber to the terminal device 100 in a corresponding communication network.

Hereinafter, an example in which the terminal device 100 performs the general communication and is not in the secure communication mode, for example, an access to the dedicated military communication network, will be referred to as the general communication mode or a first mode.

Also, an example in which the terminal device 100 is in the secure communication mode will be referred to as a second mode. While the terminal device 100 is in the second mode, an unauthorized access to the terminal device 100 through a network may be blocked and a security violation, for example, data leakage from the terminal device 100, may be prevented.

The terminal device 100 may include an application processor (AP) 103 performing operations such as running an application installed in the terminal device 100, various communication modules, for example, 111, 120, 130, and 140, a main memory 112, and a storage 150.

According to an embodiment, the foregoing components may be managed by being classified as components belonging to a permanent operation group 110 and components not belonging to the permanent operation group 110.

Here, the permanent operation group 110 may refer to a conceptual group of modules including at least one component that is managed to perform an individual function, irrespective of whether the terminal device 100 is in the first mode or the second mode.

The permanent operation group 110 may include a baseband module 111 performing an access to a cellular communication network and a data exchange and the main memory 112 assisting the application processor 103 in performing the operations.

Also, the permanent operation group 110 may include a power supply module (not shown), for example, a battery. A detailed description of the permanent operation group 110 will be provided with reference to FIG. 3.

Hereinafter, a more detailed description of each operation performed when the terminal device 100 is in the first mode and in the second mode will be provided with reference to FIGS. 2 and 3.

Figure 2:
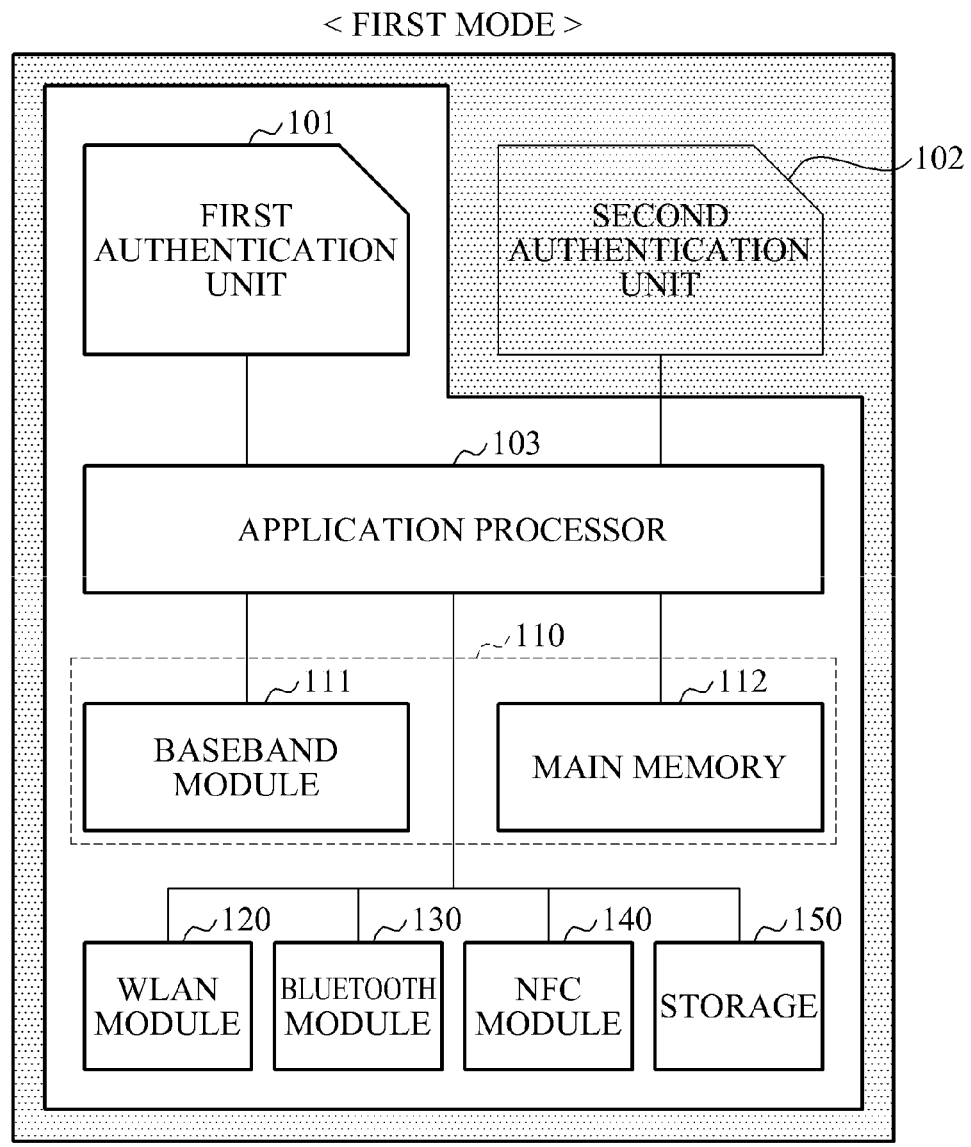
FIG. 2 is a block diagram illustrating an operation in a first mode in which the terminal device of FIG. 1 identifies a subscriber in a network using a first authentication unit according to an embodiment of the present invention.

FIG. 2 is a block diagram illustrating an operation in a first mode in which the terminal device 100 of FIG. 1 identifies a subscriber in a network using the first authentication unit 101 of FIG. 1 according to an embodiment of the present invention.

For example, the first authentication unit 101 configured by a general USIM card may identify, between the terminal device 100 and a cellular communication provider, a subscriber to the terminal device 100. In the first mode, the terminal device 100 may operate as a general smartphone and thus, a special classification of a permanent operation group 110 may not be required.

An application processor 103 may perform various operations using a main memory 112. In the first mode, the terminal device 100 may access a wireless fidelity (WiFi) network using a wireless local area network (WLAN) module 120 or perform a short-range wireless communication using a Bluetooth module 130, and a near field communication (NFC) module 140.

In the first mode, a usual access to a storage 150, as a general storage medium not including data for security, may be allowed. In the first mode, the terminal device 100 may operate in a same manner as a general smartphone, and the communication and access to the storage 150 may be managed at a general security level.

Although more detailed descriptions will follow, data handled and managed in the second mode may not be stored in the storage 150. However, data on information required to be handled only in the second mode may be stored in a protected storage, in lieu of the storage 150. The protected storage will be described with reference to FIGS. 3 and 4.

Figure 3:
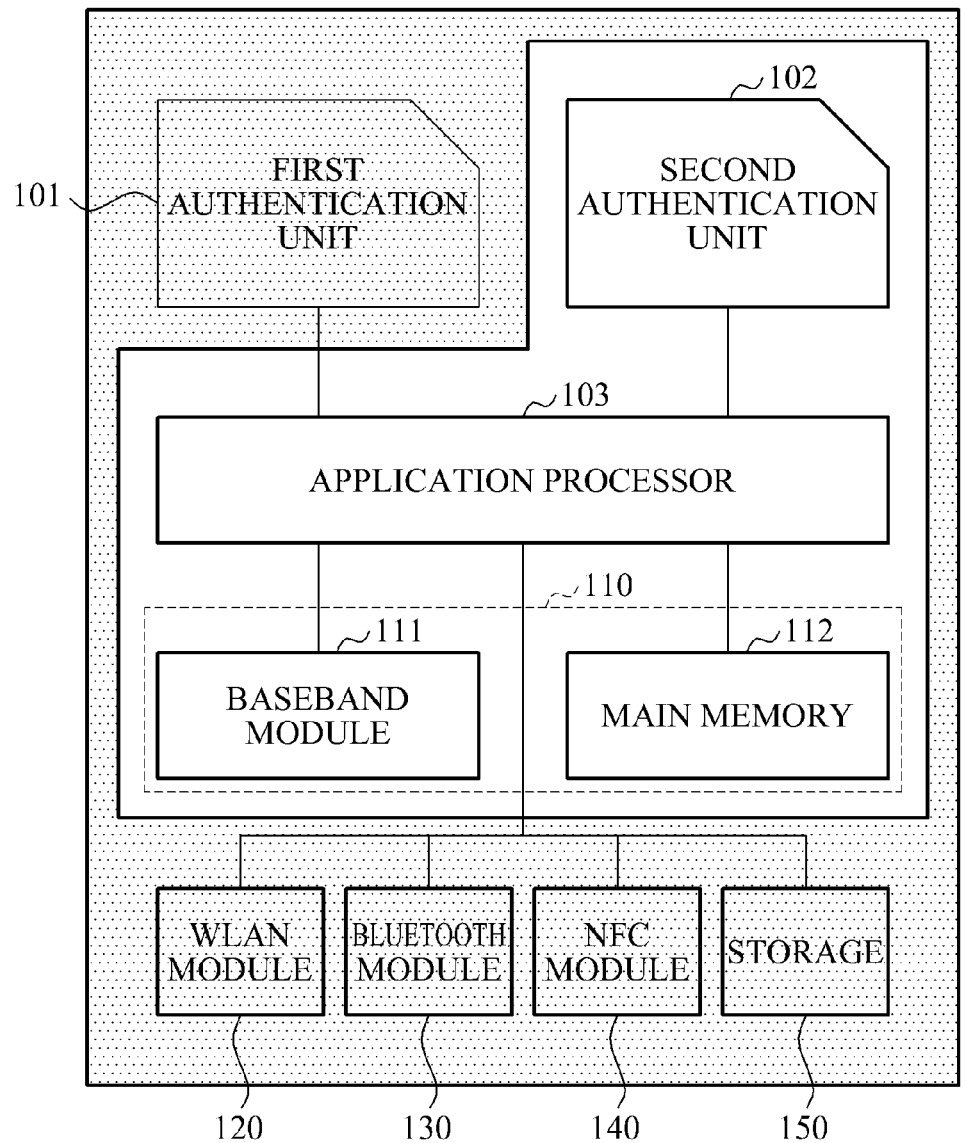
FIG. 3 is a block diagram illustrating an operation in a second mode in which the terminal device of FIG. 1 identifies a subscriber in a network using a second authentication unit according to an embodiment of the present invention.

FIG. 3 is a block diagram illustrating an operation in a second mode in which the terminal device 100 of FIG. 1 identifies a subscriber in a network using the second authentication unit 102 of FIG. 1 according to an embodiment of the present invention.

As described in the foregoing, the second mode may refer to a mode in which the terminal device 100 connects to a dedicated network separated from a general communication network for a purpose of security, and operates accordingly. Here, the dedicated network may be one of various networks, for example, a military communication network, an administrative communication network, a national agency network for electric power control, a national agency network for nuclear power systems, and a separate and dedication network for an intelligence agency.

Hereinafter, an example of the second mode used when the terminal device 100 connects to the military communication network for military purposes will be described. However, there may be various examples of the second mode and thus, the present invention should not be construed as being limited to such examples, although not stated otherwise.

In the second mode, the second authentication unit 102 may be used to identify a subscriber to the terminal device 100. For example, the second authentication unit 102 may be a USIM separately prepared and distributed for a military use.

In the second mode, authentication performed by a first authentication unit 101 that may be a USIM card for a general cellular communication may be completely excluded, and only the second authentication unit 102 may perform communication authentication, identification of the subscriber, and other operations.

According to an embodiment, a communication network accessible in the first mode and in the second mode may be different. More particularly, the first mode may relate to a connection to cellular communication provided by a general communication operator and the second mode may relate to a connection to the dedicated communication network.

However, the present invention may not be limited to the connection to the foregoing communication networks. The cellular communication provided by the communication operator may have a relatively high level of security, for example, a code division multiple access (CDMA) and a wideband code division multiple access (WCDMA). Also, the communication operator may autonomously secure a reliable level of security and thus, the second mode may relate to the connection to the cellular communication network, in lieu of the separate dedicated communication network, according to another embodiment.

In this case, the terminal device 100 may access, even in the second mode, the cellular communication network of the communication operator through a baseband module 111 in a same manner as in the first mode. Also, as in the first mode, an application processor 103 may perform various operations using a main memory 112.

However, a difference from being in the first mode may be that all other components, used for a general purpose, in which security is not established in the terminal device 100, for example, a WLAN module 120, a Bluetooth module 130, an NFC module 140, and a storage 150 may be completely inactivated. All accesses to the application processor 103 and the foregoing components may be blocked, along with an access to the terminal device 100 through the foregoing components.

Thus, in the second mode, communication through any channel, excluding an external connection through the cellular network based on identification of the subscriber performed by the second authentication unit 120, may be blocked. Also, wired communication through other input and output interfaces (not shown) may not be allowed.

Based on whether the terminal device 100 performs a general communication in the first mode or a secure communication in the second mode, an operating platform in the terminal device 100 may be completely separated and thus, a user may use the terminal device 100 as an information communication terminal for a general purpose or as a terminal for a purpose of special secure communication, for example, a military purpose. Accordingly, convenience and security may be simultaneously satisfied.

According to an embodiment, the platform may operate in a dual mode and an accessible communication network may be completely separated based on a mode and thus, an unauthorized reception and transmission of military information that may occur in various communication environments may be prevented in advance. Also, information leakage caused by, for example, an external hacking, may be prevented and thus, security may be established.

Data requiring a high level of security management, which is handled or managed in the second mode, may be stored in a separately protected storage. According to an embodiment, the protected storage may be provided in the second authentication unit 102.

Thus, the storage 150 which is a data storage space for a general purpose and the protected storage which is a data storage space for a military purpose may be physically and completely separated. An application to be installed in the terminal device 100 may be stored selectively in one of the storage 150 and the protected storage based on a purpose.

Accordingly, although the terminal device 100 may be lost, an unauthorized access to the protected storage may be blocked unless an unspecified user penetrates a security/code system and thus, a leakage of data including military information or a military application may be prevented.

Figure 4:
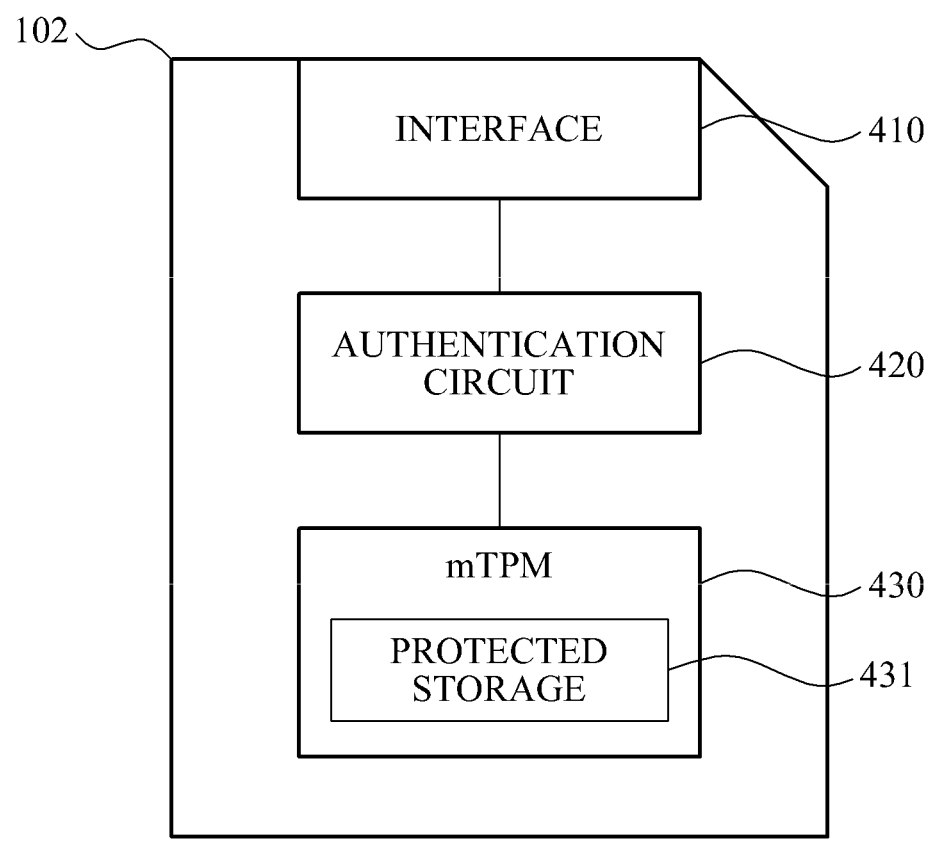
FIG. 4 is a block diagram illustrating a configuration of a second authentication unit according to an embodiment of the present invention.

More detailed descriptions of a structure of the second authentication unit 102 and implementation of the protected storage will be provided with reference to FIG. 4.

FIG. 4 is a block diagram illustrating a configuration of a second authentication unit 102 according to an embodiment of the present invention.

As described in the foregoing, the second authentication unit 102 may be a USIM card separately prepared and distributed for a military purpose or an SD card.

An interface 410 may be a terminal at which the second authentication unit 102 exchanges a signal with an external source by being in contact with the external source. The interface 410 may not be construed to be one of a contact type and a non-contact type in a limited manner. However, the interface 410 may be an input and output interface of any other type so long as the interface 410 includes an operation of the second authentication unit 102.

An authentication circuit 420 may function as a gate to determine whether to allow or block an access through the interface 410.

According to an embodiment, the authentication circuit 420 may be implemented by a PUF.

The PUF may be a circuit in which different function values occur, although an identical design drawing is prepared using a characteristic deviation generated by process variation, or a circuit provided for an electrical connection to stochastically succeed by intentionally violating a design rule in a semiconductor manufacturing process.

For example, in the semiconductor process, a thickness of vias connecting metal layers in a portion may be determined to be thinner than a thickness specified in the design rule and whether an electrical conduction occurs among the metal layers through the vias may be stochastically determined and thus, a digital value which is an unpredictable and unique identification key may be generated.

The identification key generated by the PUF may be generated unpredictably and randomly and become a value that may not be changed over time. Also, a physical cloning or a power analysis attack on the PUF may be difficult to achieve. Thus, the authentication circuit 420 may allow only an access passed through security verification using the identification key provided by the PUF.

Also, according to another embodiment, using both the PUF and a general encoder may enable dual authentication and thus, security may be improved.

According to an embodiment, the second authentication unit 102 may include a mobile trusted platform module (mTPM) 430 for secure communication. The mTPM 430 may be a trusted security module for a mobile platform and ensure platform integrity and data confidentiality.

The mTPM used for platform authentication may be a trusted security module for a mobile platform for which standardization is in progress in a trusted computing group (TCG), and Electronics and Telecommunications Research Institute (ETRI) developed an mTPM chip in 2009.

Thus, the second authentication unit 102 may be independent from an operating system (OS) and a processor, and a modification to an existing platform may be minimized. Also, a size of a chip may be reduced to extremely small and a manufacturing cost may be lowered.

According to an embodiment, the mTPM 430 may provide a protected storage 431. Data stored in the protected storage 431 may be managed by being encoded or decoded using a separate and unique key. Thus, the data, for example, a certificate, may be safely protected from an external attack.

Also, the platform integrity of a terminal device 100 of FIG. 1 may be verified by the mTPM 430, and, upon booting, a chain of trust may be verified in sequence from, for example, a basic input/output system (BIOS) to a ready-only memory (ROM) and an OS. Subsequent to the booting, a malignant code and the like may be detected and blocked in advance based on a result of real-time verification of the platform integrity.

The mTPM 430 may ensure a safe communication environment and thus, a wireless network environment with reinforced safety and reliability may be constructed.

For example, the mTPM 430 may ensure safety among platforms and the safe communication environment, and be used to verify, to another platform, to a fact that a platform is in a reliable state because an ensuring process is performed based on remote verification.

Also, it may be possible to check whether the mTPM 430 is provided and verify safety of a platform for which the verification is requested.

Although described hereinafter, in the second mode, the terminal device 100 may access a military application store additionally provided aside from a general application store or market. Here, only a signatory authentication technology of the mTPM 430 based on verification by the mTPM 430 may be used to allow an access to the military application store, and an unauthorized modification of an executable code may be prevented by integrity verification performed on an application.

According to an embodiment, a dual platform-based military smart mobile control may be enabled. Also, a network may be separated based on a purpose of use and thus, data leakage through a network other than a cellular network, for example, a secure communication route such as 3G, may be prevented. Further, a storage space may be divided based on a purpose of use and thus, a safe data management may be enabled.

Furthermore, using the mTPM 430 may ensure the platform integrity, the data confidentiality, and the safe communication environment, and a PUF based authentication circuit 420 may ensure unclonability and intensified authentication.

Thus, in a military application, a smart digital operation may be conducted and, swiftness, accuracy, and effectiveness of the operation may be increased. Also, a joint operation may be maximized by focusing combat power quantitatively and qualitatively during a certain period. Further, a commercial information technology that has been continuously developed may be safely used and thus, significant changes may be made to a military operation paradigm.

Hereinafter, illustrative applications will be described with reference to FIGS. 5 through 8 to introduce a change in the military operation paradigm.

Figure 5:
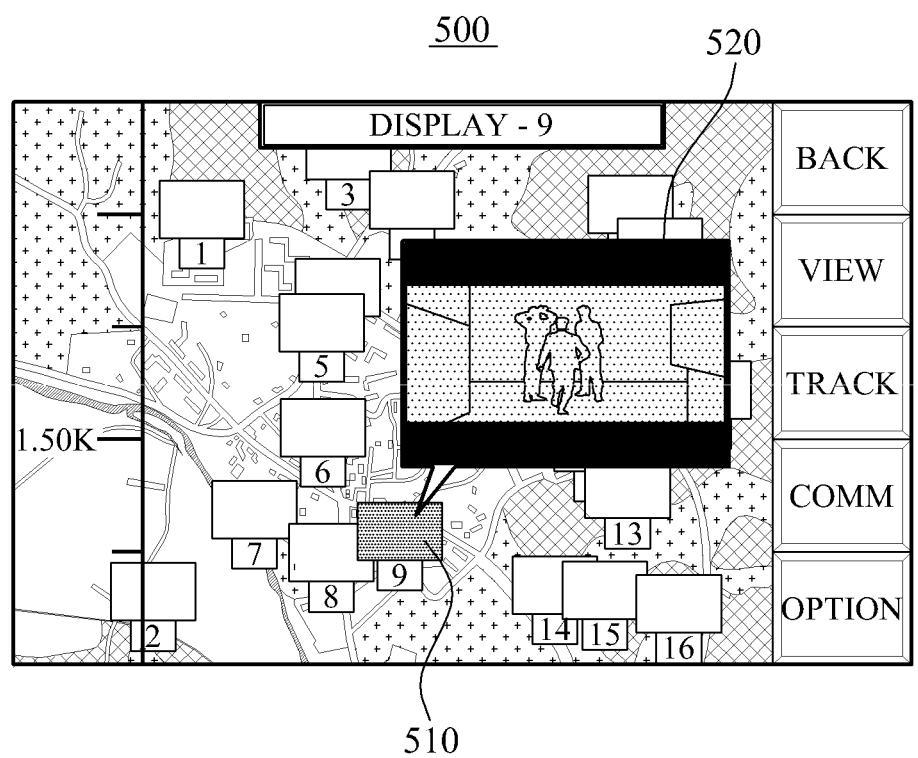
FIGS. 5 and 6 are conceptual diagrams of examples to which an information security terminal device is applied according to an embodiment of the present invention.
Figure 6:
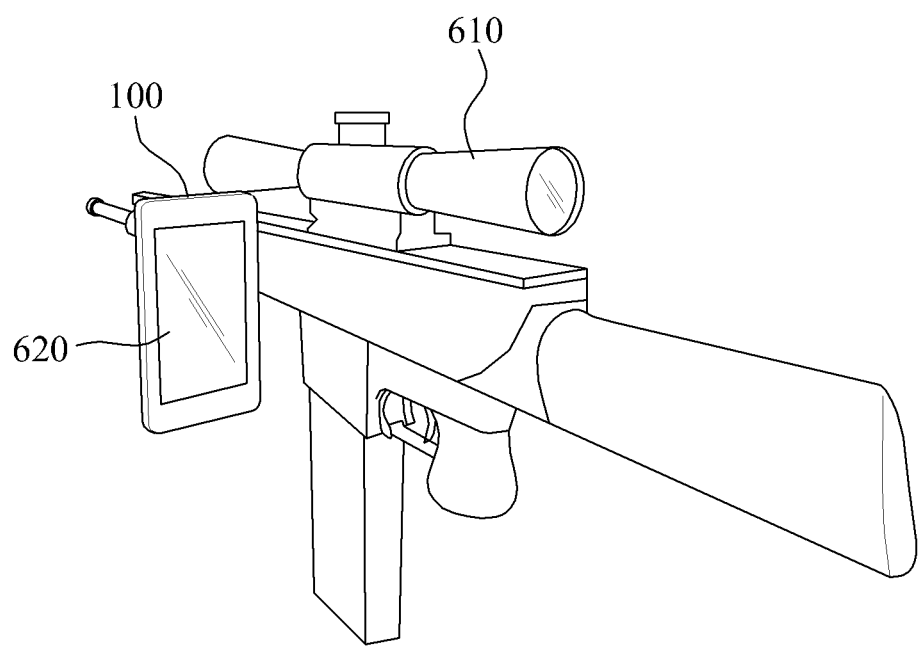

FIGS. 5 and 6 are conceptual diagrams of examples to which an information security terminal device is applied according to an embodiment of the present invention.

FIG. 5 is a conceptual diagram illustrating an example in which security is improved in a military application of a smartphone to which a system according to an embodiment of the present invention is applied.

As shown in the example, a provided application 500 may comprehensively analyze and transmit real-time data on locations and states of soldiers in action and display, on a map, moving routes, locations, and states of enemy and friendly forces.

When a user selects an associate icon 510, a real-time video 520 of a corresponding associate in action may be transmitted through a camera disposed on a helmet of the corresponding associate.

When such an application operates using an existing smart mobile device, a security issue may arise because the smart mobile device may be exposed to a universal communication environment, for example, WiFi and Bluetooth communications that have a frequency band in which an encoding level is not high. However, according to an embodiment, the application may be safely used and distributed absent security issues.

FIG. 6 is an example in which a ballistic computation application 620 for a sniper is executed in a terminal device 100 and the terminal device 100 is directly attached to an individual weapon 610.

Using the application 620, ballistic computation may be performed based on a range, climatic conditions including temperature, atmospheric pressure, humidity, wind speed, and wind direction, and a profile of a weapon.

According to an embodiment, the application 620 may safely operate, although a security issue may arise when the application 620 is executed in an existing smart mobile device.

According to an embodiment, in a case of the weapon 610 and the terminal device 100 both being lost, confidential subjects may be completely protected and information leakage may be prevented.

Figure 7:
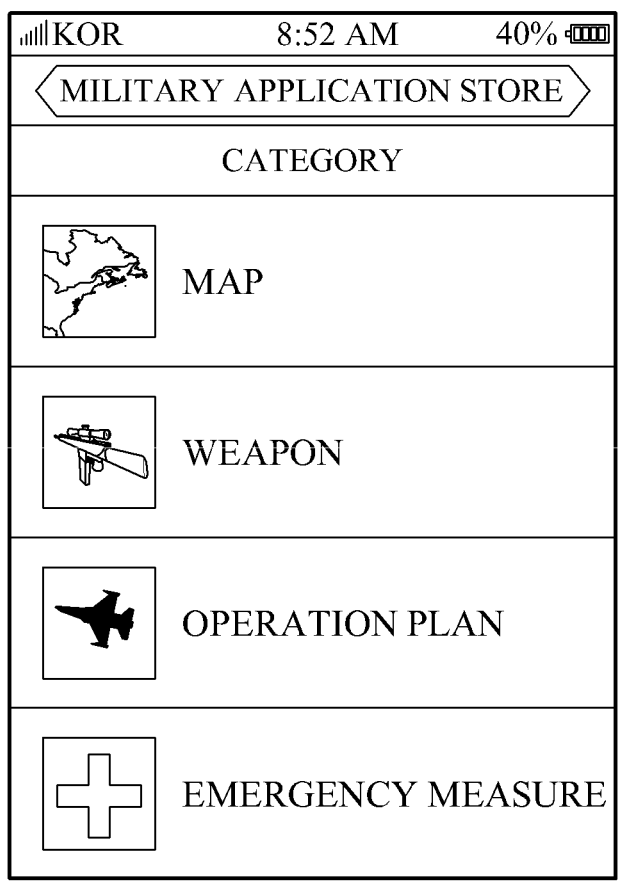
FIG. 7 illustrates an application store provided according to an embodiment of the present invention.

FIG. 7 illustrates an application store provided according to an embodiment of the present invention.

According to an embodiment, distribution and management of a military application may be performed by a dedicated military application store in a controlled environment, not by a commercial open market or store.

The application store may be accessible, through secure authentication, only when a terminal device 100 is in a second mode, and may distribute and update a military application.

For an operation of the application store, various administrative factors may be added. A developer verification procedure may be ensured by an authentication certificate based on a code signing of a developer, and a verification center may verify whether the military application is safe based on security verification and thus, safety of the military application may be ensured.

Figure 8:
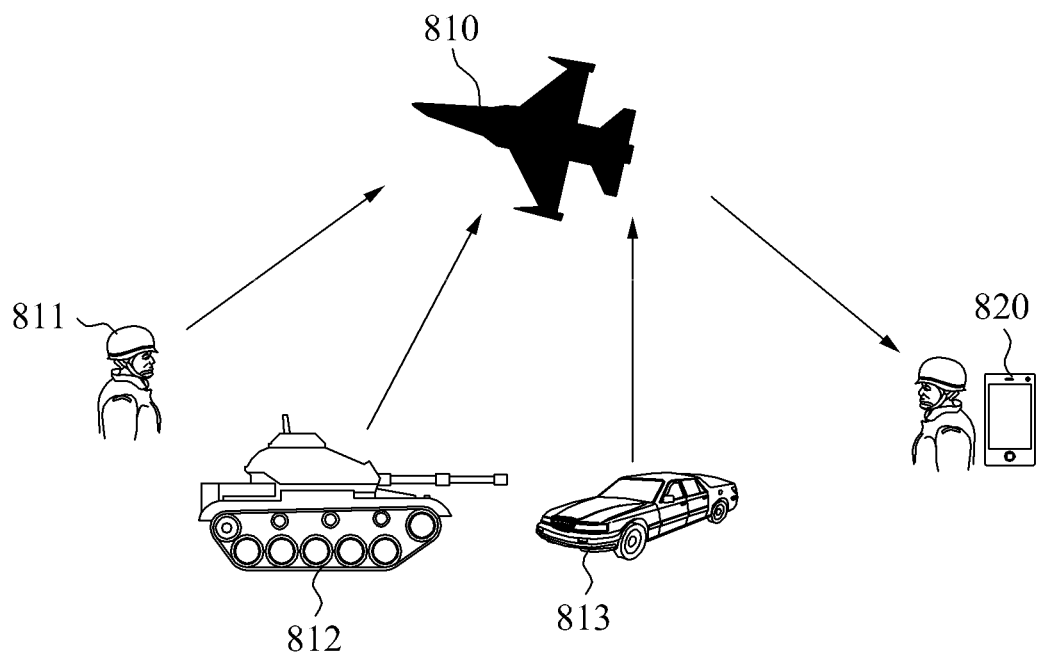
FIG. 8 is a conceptual diagram illustrating a change in a military operation environment according to an embodiment of the present invention.

FIG. 8 is a conceptual diagram 800 illustrating a change in a military operation environment according to an embodiment of the present invention.

According to an embodiment, a level of information security may be improved and thus, a joint operation between different forces, for example, an air force and an infantry, may be performed through smart operations.

Through secure communication between an unmanned aircraft 810 operated by the air force and a terminal device 820 of the infantry, information, for example, a vehicle number 813 observed and provided by the unmanned aircraft 810, may be forwarded. Also, a current state of a friendly force, for example, a naval force 811, and a weapon 812 may be verified, and a military action, for example, a strategy, may be exchanged.

The above-described exemplary embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

101: First authentication unit
102: Second authentication unit
103: Application processor
111: Baseband module
112: Main memory
120: WLAN module
130: Bluetooth module
140: NFC module
150: Storage

The invention claimed is:

1. A terminal device, comprising:
an application processor configured to perform information processing for the terminal device;
a first authentication unit configured to identify a subscriber when the terminal device connects to a communication network; and
a second authentication unit configured to identify the subscriber to the terminal device by exclusively operating with the first authentication unit, the second authentication unit including an authentication circuit and an authentication module,
wherein, when the second authentication unit identifies the subscriber to the terminal device, the application processor inactivates remaining modules among modules in the terminal device for communication or data storage, from which a predetermined permanent operation group is excluded,
wherein the authentication circuit is configured to block an unauthorized external access by performing secure authentication, and
wherein the authentication module is configured to identify the subscriber to the terminal device with respect to an access authorized by the authentication circuit.

2. The terminal device of claim 1, wherein the permanent operation group comprises a baseband module configured to provide a cellular communication connection.

3. The terminal device of claim 1, wherein the remaining modules, excluding the permanent operation group, comprise at least one of a wireless local area network (WLAN) module, a Bluetooth module, a near field communication (NFC) module, and data storage media.

4. The terminal device of claim 1, wherein the authentication module is configured by a mobile trusted platform module (mTPM).

5. The terminal device of claim 1, wherein the authentication module comprises a protected storage.

6. The terminal device of claim 1, wherein the authentication circuit comprises a physical unclonable function (PUF), and
wherein the authentication circuit is configured to perform the secure authentication using at least one identification key provided by the PUF.

7. The terminal device of claim 1, wherein at least one of the first authentication unit and the second authentication unit is provided in a form of a subscriber identity module (SIM) card.

8. The terminal device of claim 1, wherein the second authentication unit is provided in a form of a secure digital (SD) card.

9. A terminal device, comprising:
a first authentication unit including one or more processors and configured to identify a first subscriber to be connected to a first communication network; and
a second authentication unit configured to identify a second subscriber to be connected to a second communication network different from the first communication network, the second authentication unit including an authentication circuit and an authentication module,
wherein the authentication module is configured to identify the second subscriber to the terminal device with respect to an access authorized by the authentication circuit via the second communication network, and
wherein the authentication circuit is configured to block unauthorized external access to the terminal device when the authentication module identifies the second subscriber by causing an inactivation of modules in the terminal device for communication or data storage, thereby preventing communications with the terminal device other than via the second communication network.

10. The terminal device of claim 9, wherein the second communication network is one of a dedicated military communication network, a dedicated administrative communication network, and a dedicated power management communication network.

11. The terminal device of claim 9, wherein the second authentication unit comprises an authentication module configured by a mobile trusted platform module (mTPM).

12. The terminal device of claim 11, wherein the authentication module comprises a protected storage.

13. The terminal device of claim 9, wherein the authentication circuit comprises a physical unclonable function (PUF), and
wherein the authentication circuit is configured to perform the secure authentication using at least one identification key provided by the PUF.

14. A security management method for a terminal device, the method comprising:
identifying, by one or more processors associated with a second authentication unit, a subscriber to the terminal device;
selectively preventing, by one or more processors associated with the second authentication unit, the identification of the subscriber to the terminal device by one or more processors associated with a first authentication unit when the second authentication unit identifies the subscriber;
performing, by one or more processors associated with the second authentication unit, secure authentication of communications when the second authentication unit identifies subscriber; and
blocking, by one or more processors associated with the second authentication unit, unauthorized external access to the terminal device when the subscriber is identified via the second authentication by inactivating at least one communication module of the terminal device to prevent communications with the terminal device other than via communications that have been securely authenticated via the second authentication unit.

15. The method of claim 14, wherein the act of blocking external access to the terminal device comprises:
blocking access to the terminal device through an external input and output interface.

16. The method of claim 14, wherein:
when the one or more processors of the first authentication unit identifies the subscriber to the terminal device, communicating, by one or more processors of the terminal device, with a cellular network provided by an external communication operator; and
when the one or more processors of the second authentication unit identifies the subscriber to the terminal device, communicating, by one or more processors of the terminal device, with a secure communication network different from the cellular network.

* * * * *